(12) United States Patent
Chen

(10) Patent No.: US 7,228,761 B1
(45) Date of Patent: Jun. 12, 2007

(54) FOLDABLE PEDAL ASSEMBLY

(76) Inventor: Chung-I Chen, No. 2, Lane 986, Sec. 1, Chung-Shan Rd., Ta-Chia Chen, Taichung Hsien (TW)

( * ) Notice: Subject to any disclaimer, the term of this patent is extended or adjusted under 35 U.S.C. 154(b) by 93 days.

(21) Appl. No.: 11/247,191

(22) Filed: Oct. 12, 2005

(51) Int. Cl.
*G05G 1/14* (2006.01)
(52) U.S. Cl. ..................... 74/594.7; 74/594.4
(58) Field of Classification Search ............... 74/594.4, 74/594.7; 280/278; B62K 15/00; B62M 3/08
See application file for complete search history.

(56) References Cited

U.S. PATENT DOCUMENTS

| | | | | |
|---|---|---|---|---|
| 1,091,405 | A | * | 3/1914 | Trambley .................. 74/594.7 |
| 1,122,342 | A | * | 12/1914 | Westerberg ................ 74/594.7 |
| RE14,107 | E | * | 4/1916 | Reynolds et al. .......... 74/594.7 |
| 1,196,190 | A | * | 8/1916 | Warren ....................... 74/594.7 |
| 1,276,139 | A | * | 8/1918 | Waren ....................... 74/594.7 |
| 2006/0006624 | A1 | * | 1/2006 | Mihelic ....................... 280/278 |

FOREIGN PATENT DOCUMENTS

DE 029917750 U1 * 2/2000

* cited by examiner

*Primary Examiner*—Vinh T. Luong
(74) *Attorney, Agent, or Firm*—Pillsbury Winthrop Shaw Pittman, LLP

(57) ABSTRACT

A foldable pedal assembly includes: a pedal frame formed with left and right studs opposite to each other in an axial direction; a crank-connecting part including left and right wing units that define left and right recesses, respectively, the left and right studs extending into the left and right recesses and being pivoted to the left and right wing units, respectively; left and right urging members disposed in the left and right recesses to urge the pedal frame in a first direction transverse to the axial direction, and to urge the crank-connecting part in a second direction opposite to the first direction; a first limiting unit abutting against at least one of the left and right studs by urging action of the urging members; and a second limiting unit abutting against at least one of the left and right wing units by urging action of the urging members.

6 Claims, 12 Drawing Sheets

FOLDABLE PEDAL ASSEMBLY

BACKGROUND OF THE INVENTION

1. Field of the Invention

The invention relates to a bicycle pedal, more particularly to a foldable pedal assembly for a bicycle.

2. Description of the Related Art

Many consumers favor foldable bicycles due to convenience when carrying the same. To further reduce the size after folding, pedals mounted on a foldable bicycle are also foldable in design. As shown in FIGS. 1 and 2, a conventional foldable bicycle pedal 10 includes: a pedal body 11 having an intermediate rod 112, a pair of spaced apart lateral rods 111 which extend from opposite ends of the intermediate rod 112 and which are formed with slide grooves 114, and a pair of upper and lower ribs 113 interconnecting the lateral rods 111, one of the ribs 113 being formed with an engaging hole 115; a movable member 12 that is slidably received in the slide grooves 114, that is formed with a through-hole 123, and that has a stud 121 and a pair of protrusions 122 disposed opposite to the studs 121 in a direction; a spring 13 sleeved on the stud 121 and having a biasing end against the intermediate rod 112; a connecting part 14 formed with a pair of pivot grooves 142 and having an engaging portion 141 engaging the engaging hole 115 for connection to the pedal body 11; a crank-connecting member 15 formed with a pair of retaining grooves 152 and having a pair of pivots 151 pivotably retained in the pivot grooves 142; and a shaft 16 rotatably mounted on the crank-connecting member 15.

When the crank-connecting member 15 is disposed parallel to the pedal body 11, i.e., the foldable bicycle pedal 10 is disposed in a state ready for use, the protrusions 122 of the movable member 12 extend into the retaining grooves 152 for engagement therewith.

To fold the foldable bicycle pedal 10, the movable member 12 can be accessed through the through-hole 123 for moving the movable member 12 against biasing force of the spring 13 toward the intermediate rod 112 such that the protrusions 122 of the movable member 12 are disengaged from the retaining grooves 152. Thereafter, the assembly of the connecting part 14, the movable member 12 and the pedal body 11 is pivoted relative to the crank-connecting member 15 to a position transverse the crank-connecting member 15 so as to place the foldable bicycle pedal 10 in a folded state.

The conventional foldable bicycle pedal 10 is disadvantageous in that: coupling of the pedal body 11 and the crank-connecting member 15 through the interaction action between the spring 13 and the movable member 12 is relatively loose, which has an adverse effect on the contact between the foot of the user and the bicycle pedal 10 upon treading thereon.

SUMMARY OF THE INVENTION

Therefore, the object of the present invention is to provide a foldable pedal assembly that can overcome the aforesaid drawback associated with the prior art.

Accordingly, a foldable pedal assembly of this invention comprises: a pedal frame defining a frame space and formed with left and right studs that are opposite to each other in an axial direction and that protrude into the frame space; a crank-connecting part adapted to be connected to a crank of a bicycle and including left and right wing units that define left and right recesses, respectively, the crank-connecting part extending into the frame space, the left and right studs extending into the left and right recesses and being pivoted to the left and right wing units, respectively; left and right urging members disposed in the left and right recesses, respectively, each of the left and right urging members abutting against a respective one of the left and right studs and a respective one of the left and right wing units so as to urge the pedal frame in a first direction that is transverse to the axial direction, and so as to urge the crank-connecting part in a second direction that is opposite to the first direction; and first and second limiting units provided on the crank-connecting part and the pedal frame, respectively, the first limiting unit abutting against at least one of the left and right studs by virtue of the urging action of a respective one of the left and right urging members against the crank-connecting part, the second limiting unit abutting against at least one of the left and right wing units by virtue of the urging action of a respective one of the left and right urging members against the pedal frame.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
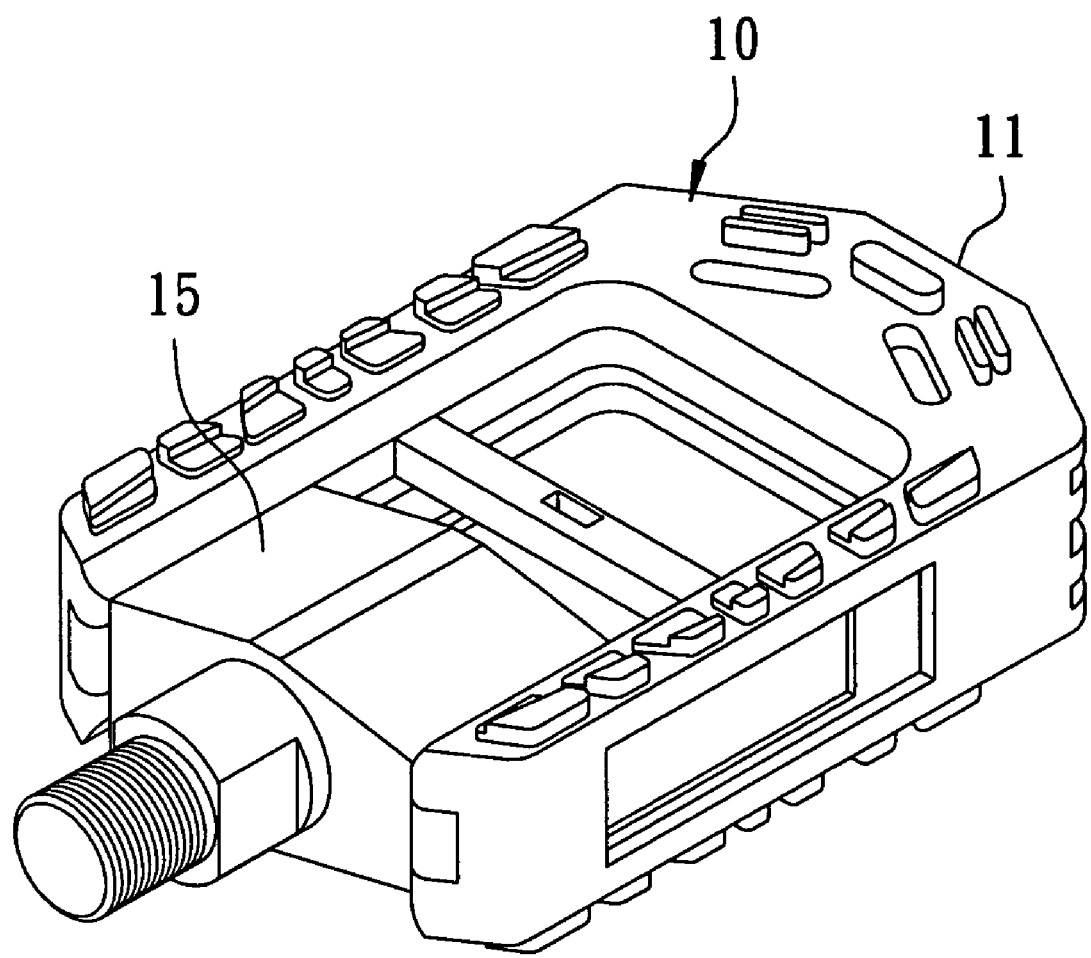
FIG. 1 is an assembled perspective view of a conventional foldable bicycle pedal.
Figure 2:
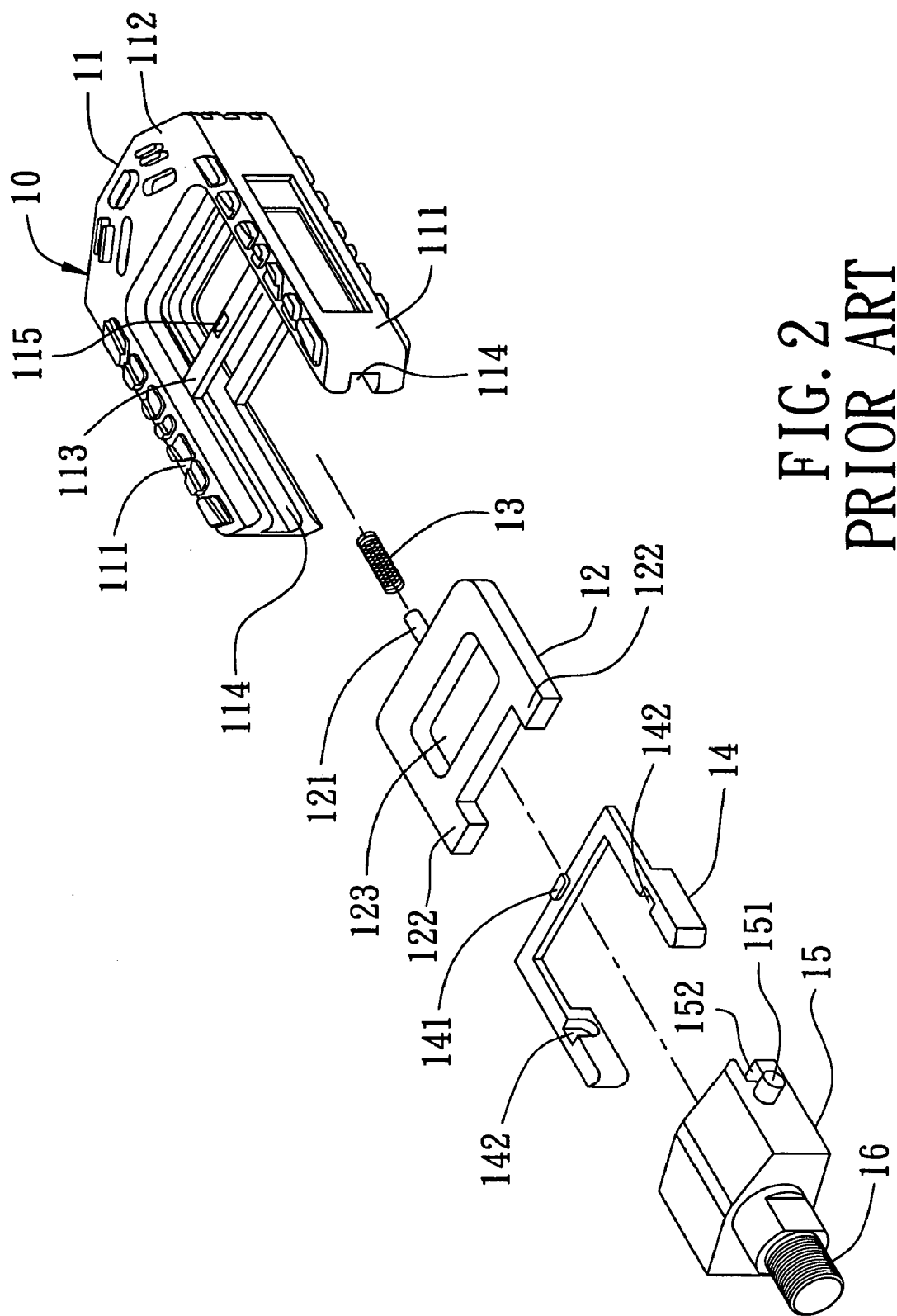
FIG. 2 is an exploded perspective view of the conventional foldable bicycle pedal.
Figure 3:
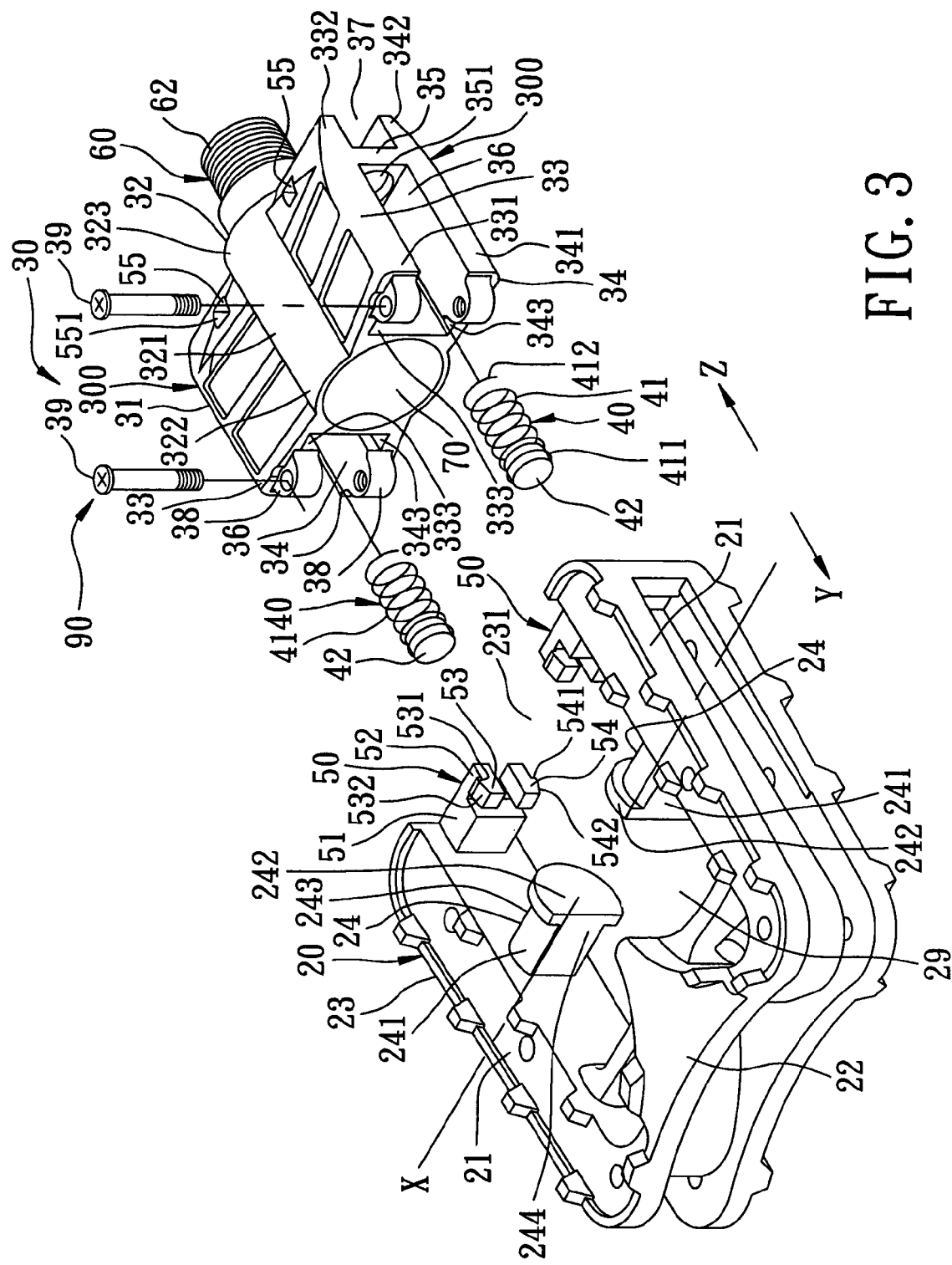
FIG. 3 is an exploded perspective view showing the preferred embodiment of a foldable pedal assembly according to the present invention.
Figure 6:
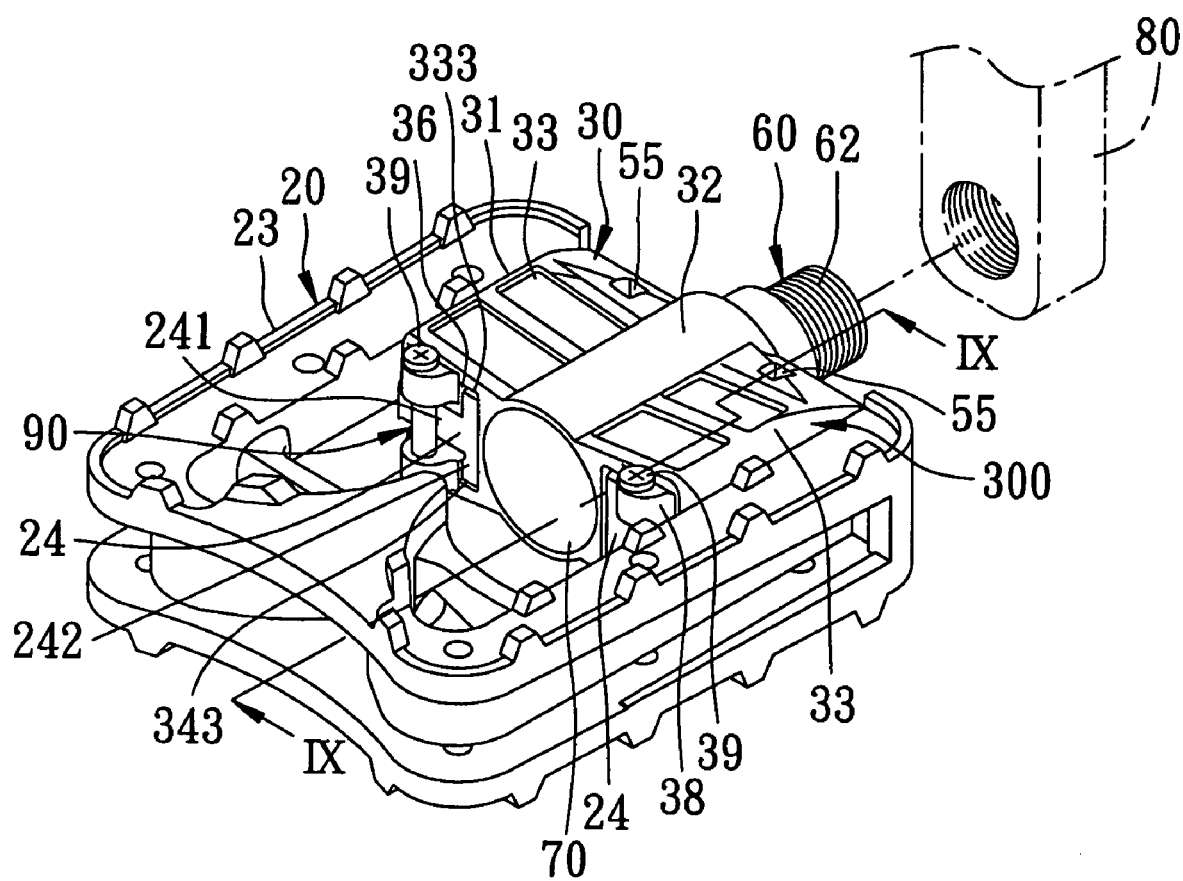
FIG. 6 is an assembled perspective view of the preferred embodiment disposed in a non-folded state, with a bicycle crank to be connected thereto.
Figure 7:
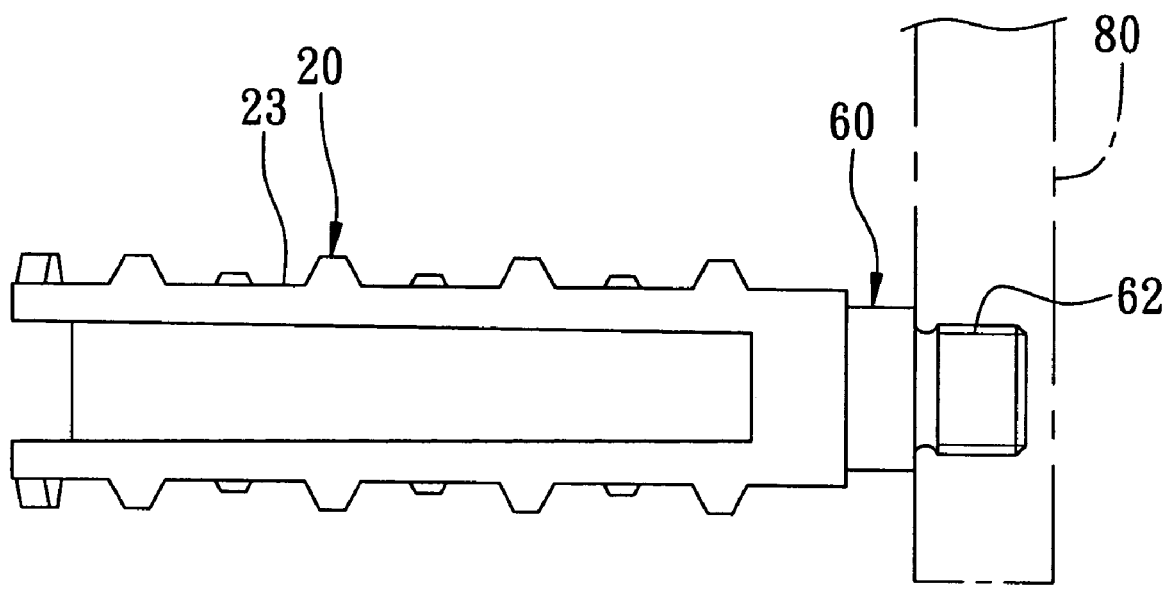
FIG. 7 is a schematic side view of FIG. 6.

Referring to FIGS. 3 and 6, the preferred embodiment of a foldable pedal assembly according to the present invention is shown to be adapted to be mounted on one end portion of a bicycle crank 80 of a bicycle. The foldable pedal assembly includes: a pedal frame 20 defining a frame space 29 and formed with left and right studs 24 that are opposite to each other in an axial direction relative to an axis (X) and that protrude into the frame space 29; a crank-connecting part 30 adapted to be connected to the bicycle crank 80 and including left and right wing units 300 that define left and right recesses 36, respectively, the crank-connecting part 30 extending into the frame space 29, the left and right studs 24 extending into the left and right recesses 36 and being pivoted to the left and right wing units 33, 34, respectively, so as to permit rotation of the pedal frame 20 about the axis (X) relative to the crank-connecting part 30; left and right urging members 40 disposed in the left and right recesses 36, respectively, each of the left and right urging members 40 abutting against a respective one of the left and right studs 24 and a respective one of the left and right wing units 300 so as to urge the pedal frame 20 in a first direction (Y) that is transverse to the axial direction, and so as to urge the crank-connecting part 30 in a second direction (Z) that is opposite to the first direction (Y); and first and second limiting units 90, 50 provided on the crank-connecting part 30 and the pedal frame 20, respectively, the first limiting unit 90 abutting against at least one of the left and right studs 24 by virtue of the urging action of a respective one of the left and right urging members 40 against the crank-connecting part 30, the second limiting unit 50 abutting against at least one of the left and right wing units 300 (see FIG. 8) by virtue of the urging action of a respective one of the left and right urging members 40 against the pedal frame 20.

Figure 8:
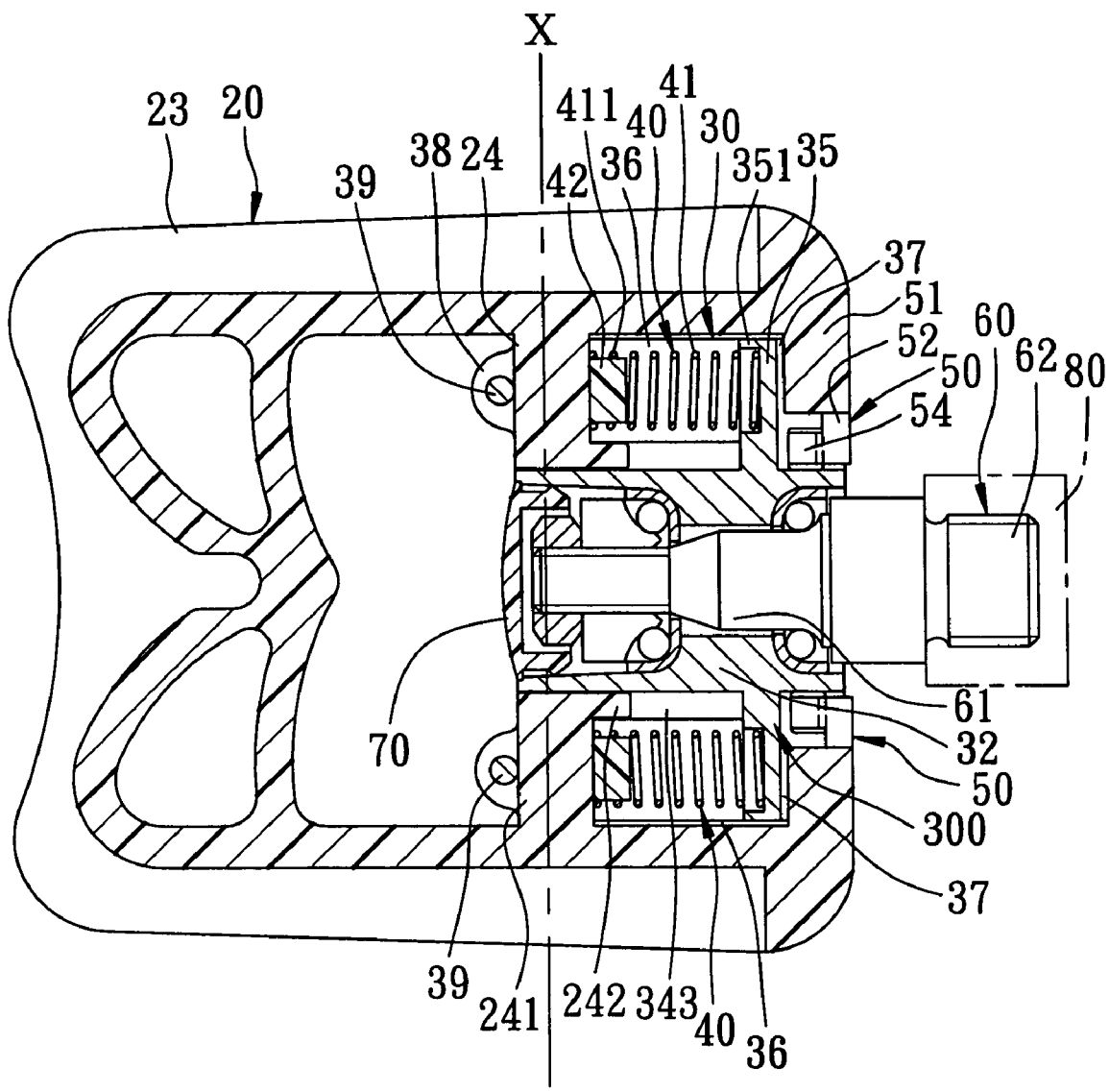
FIG. 8 is a sectional view of the preferred embodiment.
Figure 9:
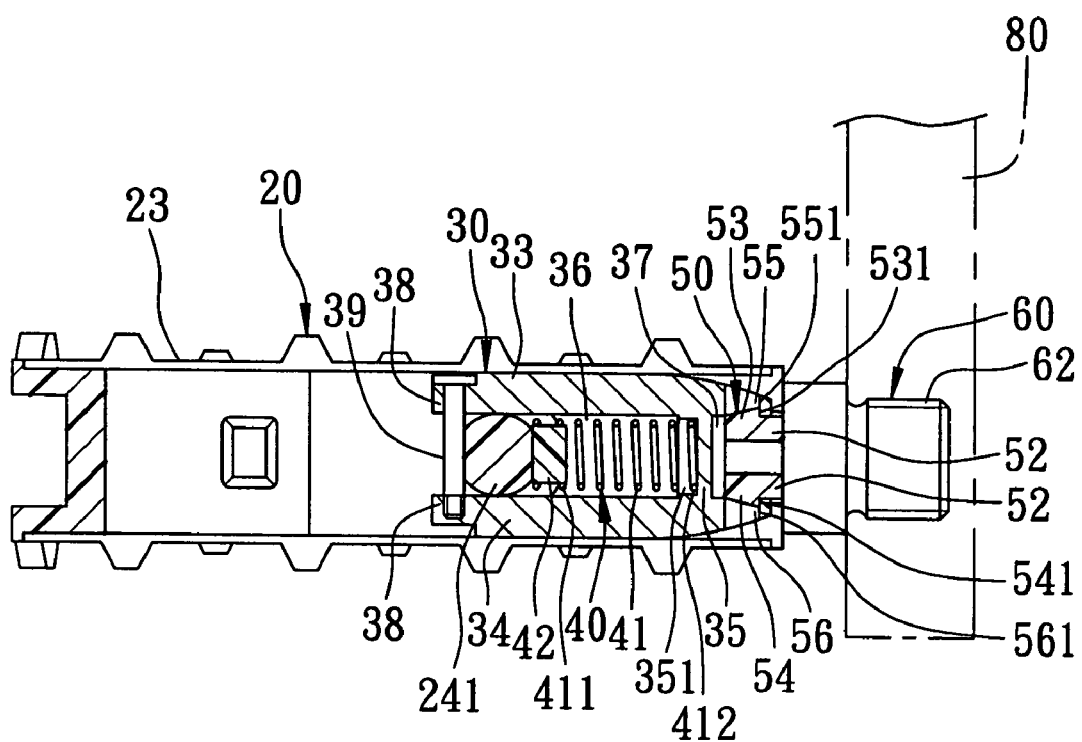
FIG. 9 is a side sectional view of FIG. 6 taken along lines IX—IX.

In this embodiment, referring once again to FIG. 3, the first limiting unit 90 includes left and right bolts 39. With further reference to FIGS. 6 and 8, each of the left and right wing units 300 includes spaced apart upper and lower wing plates 33, 34 and a partitioning plate 35 that is transverse to and that interconnects the upper and lower wing plates 33, 34 and that cooperates with the upper and lower wing plates 33, 34 to define a respective one of the left and right recesses 36. Each of the upper and lower wing plates 33, 34 has a first end 331, 341 that is formed with an ear 38. Each of the left and right studs 24 has first and second sides 243, 244. Each of the left and right urging members 40 abuts against the first side 243 of the respective one of the left and right studs 24 and the partitioning plate 35 of the respective one of the left and right wing units 300. Each of the left and right bolts 39 extends through the ears 38 of the upper and lower wing plates 33, 34 of the respective one of the left and right wing units 300, and abuts against the second side 244 of the respective one of the left and right studs 24 by the urging action of the respective urging member 40 against the crank-connecting part 30. Moreover, in this embodiment, the ear 38 of the lower wing plate 34 of each of the left and right wing units 300 has an inner thread. Each of the left and right bolts 39 has an outer thread that engages threadedly the inner thread of the ear 39 of the lower wing plate 34 of the respective one of the left and right wing units 300.

In this embodiment, as shown in FIGS. 3,6 and 8, each of the upper and lower wing plates 33, 34 further has a second end 332, 342 that is opposite to the first end 331, 341 of the respective one of the upper and lower wing plates 33, 34 and that is formed with a retaining hole 551. The second ends 332, 342 of the upper and lower wing plates 33, 34 and the partitioning plate 35 of each of the left and right wing units 300 cooperatively define a protrusion-receiving recess 37 opposite to a respective one of the left and right recesses 36. The pedal frame 20 has left and right frame walls 21. The left and right studs 24 protrude respectively from the left and right frame walls 21. The second limiting unit 50 includes left and right protrusions 51 that protrude respectively from the left and right frame walls 21 into the frame space 29, and that project into the protrusion-receiving recesses 37 in the left and right wing units 300, respectively. Each of the left and right protrusions 51 has a bifurcated free end 52 that is formed with upper and lower barbs 53, 54. Each of the upper and lower barbs 53, 54 of each of the left and right protrusions 51 extends into the retaining hole 551 in the second end 332, 342 of a respective one of the upper and lower wing plates 33, 34 of the respective one of the left and right wing unit 300. The engaging manner of the upper and lower barbs 53, 54 and the retaining hole 551 is typically tongue-and-groove in that, each of the upper and lower barbs 53, 54 includes a slant face 532, 542 for guiding the barbs 53, 54 into the respective retaining hole 551, and a shoulder 531, 541 for abutting against the wall defining the respective retaining hole 551. In this embodiment, while each of the second limiting units 50 is configured with both of the upper and lower barbs 53, 54, it should be noted herein that, if configured with only one of the upper and lower barbs 53, 54, the same engaging effect could be achieved as well. However, configuring with both of the barbs 53, 54 will enhance the engaging effect.

It should be further noted herein that the pedal frame 20 is made of plastic, and includes a U-shaped frame body 23 that has an intermediate frame wall 22 interconnecting the left and right frame walls 21. The crank-connecting part 30 further includes a tubular sleeve 32. The left and right wing units 300 extend from the sleeve 32 in opposite directions. The sleeve 32 defines a shaft-receiving hole, and has a first open end 322 facing the pedal frame 20, and a second open end 323 opposite to the first open end 322. Preferably, each of the upper and lower wing plates 33, 34 of each of the left and right wing units 300 is formed with a guiding groove 333, 343 disposed adjacent to the sleeve 31. Each of the left and right studs 24 has a shank 241 and an enlarged free end 242 that extends from the shank 241 and that extends into the guiding grooves 333, 343 in the upper and lower wing plates 33, 34 of the respective one of the left and right wing units 300, as best shown in FIG. 8.

Preferably, each of the urging members 40 includes a compression spring 41 having opposite first and second urging ends 411, 412 for biasing against the first side 243 of the respective one of the studs 24 and the respective one of the partitioning plates 35, respectively, and an abutting disc 42 with the first urging end 411 sleeved therewith. Preferably, the partitioning plate 35 of each of the left and right wing units 300 is formed with a blind hole 351 for retaining the second urging end 412 of the respective one of the left and right urging members 40.

Preferably, referring to FIGS. 3 and 8, the foldable bicycle pedal further includes a crank engaging tube 60 rotatably engaging the crank-connecting part 30 and adapted for mounting threadedly on the bicycle crank 80. The crank engaging tube 60 includes an engaging shaft section 61 inserted into and engaging the shaft-receiving hole of the sleeve 32, and a threaded section 62 opposite to the engaging shaft section 61 and exposed outwardly of the second open end 323 of the sleeve 32 for mounting threadedly on the crank 80.

Preferably, as shown in FIGS. 3 and 8, the foldable pedal assembly further comprises a seal cap 70 for sealingly covering the first open end 322 of the sleeve 32 so as to prevent entry of dust therein and so as to ensure smooth rotation of the crank-connecting part 30 about the crank engaging tube 60.

Figure 4:
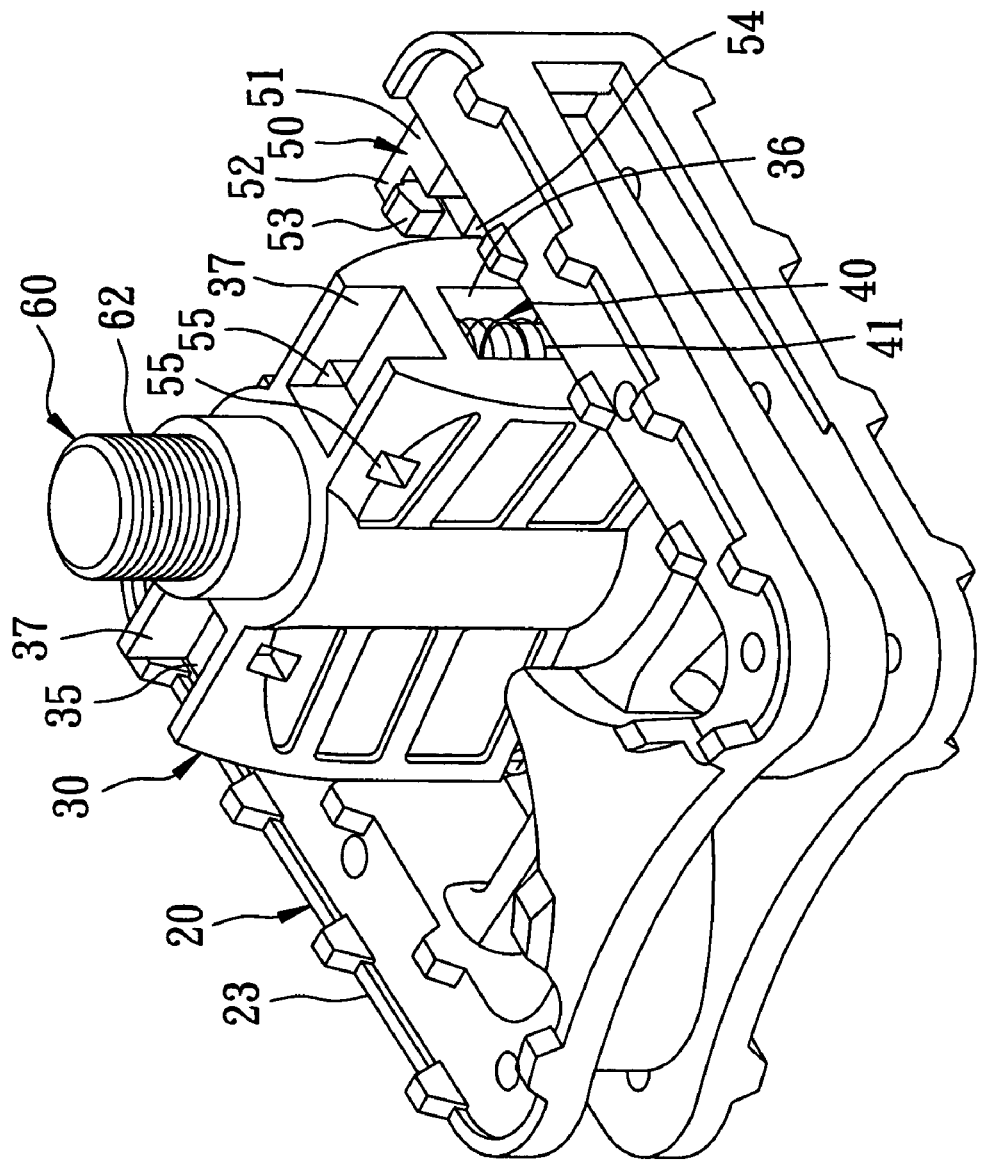
FIG. 4 is an assembled perspective view of the preferred embodiment disposed in a folded state.
Figure 5:
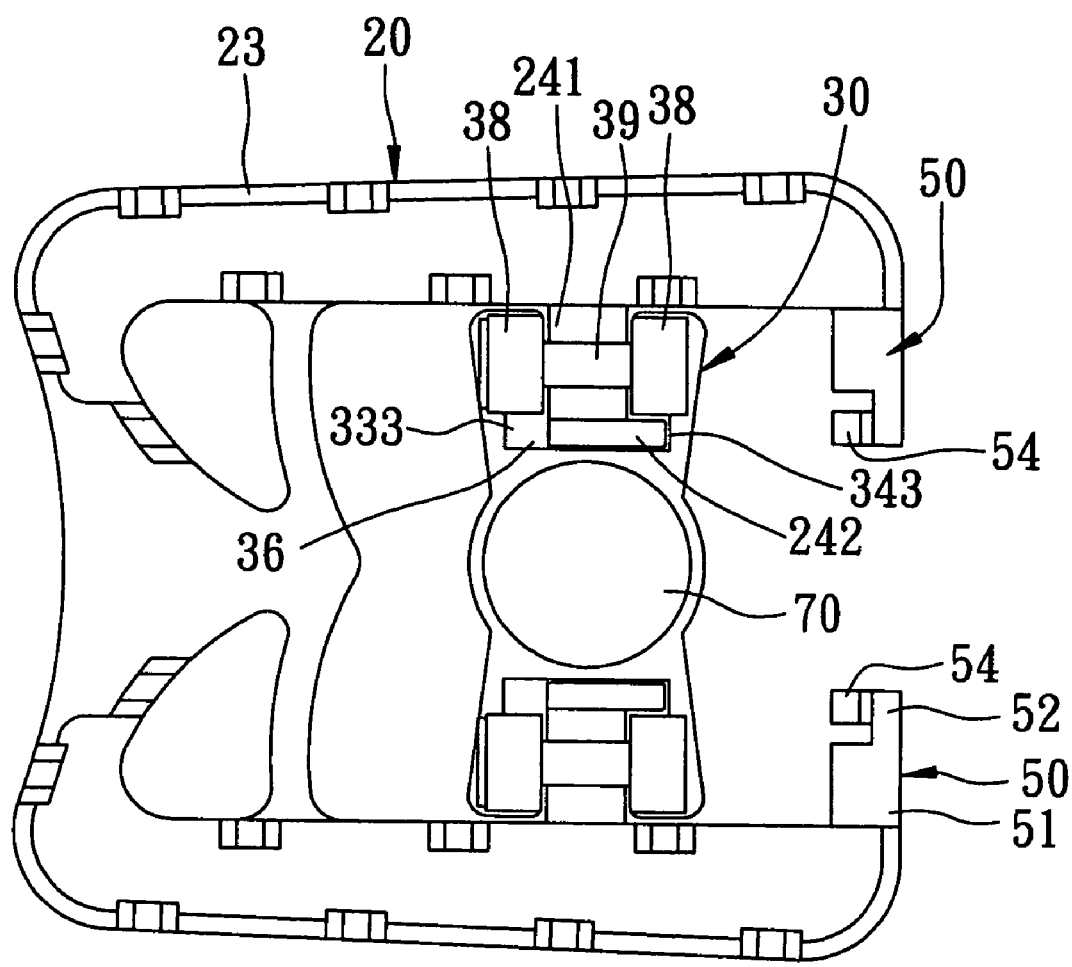
FIG. 5 is a bottom view of FIG. 4.

In assembly, as shown in FIGS. 4 and 5, the crank-connecting part 30 is placed transversely over the pedal frame 20 such that the left and right recesses 36 are aligned with the left and right studs 24 respectively, and a downward force is then exerted upon the crank-connecting part 30 so that the left and right studs 24 enter into the respective left and right recesses 36 to compress the urging members 40 and so that the enlarged ends 242 of the left and right studs 24 extend into the guiding grooves 333, 343 in the upper and lower wing plates 33, 34. Next, as shown in FIGS. 6, 7, 8 and 9, the pedal frame 20 is pivoted about the axis (X) of the studs 24 until the left and right protrusions 51 are received in the protrusion-receiving recesses 37, and the upper and lower barbs 53,54 of each of the left and right protrusions 51 extend into the retaining holes 551 in the upper and lower wing plates 33, 34 of the respective one of the left and right wing units 300. Then, the bolts 39 of the first limiting unit 90 are extended through the ears 38 and are tightened thereto. The crank engaging tube 60 is inserted into the sleeve 32 of the crank-connecting part 30 so as to complete the assembly process of the foldable pedal assembly, and the foldable pedal assembly is ready to be mounted on the crank 80 through the threaded section 62 of the crank engaging tube 60.

When the foldable pedal assembly is disposed at the non-folded state, the bolts 39 of the first limiting unit 90 abut against the left and right studs 24 by virtue of the urging action of the respective one of the left and right urging members 40 against the crank-connecting part 30, while the upper and lower barbs 53, 54 of each of the protrusions 51 of the second limiting unit 50 abut against the upper and lower wing plates 33, 34 of the left and right wing units 300 by virtue of the urging action of the respective one of the left and right urging members 40 against the pedal frame 20. In this manner, the engagement between the pedal frame 20 and the crank-connecting part 30 is ensured so as to impart the pedal assembly with a property that ensures firm contact between the user's foot and the pedal assembly.

Figure 10:
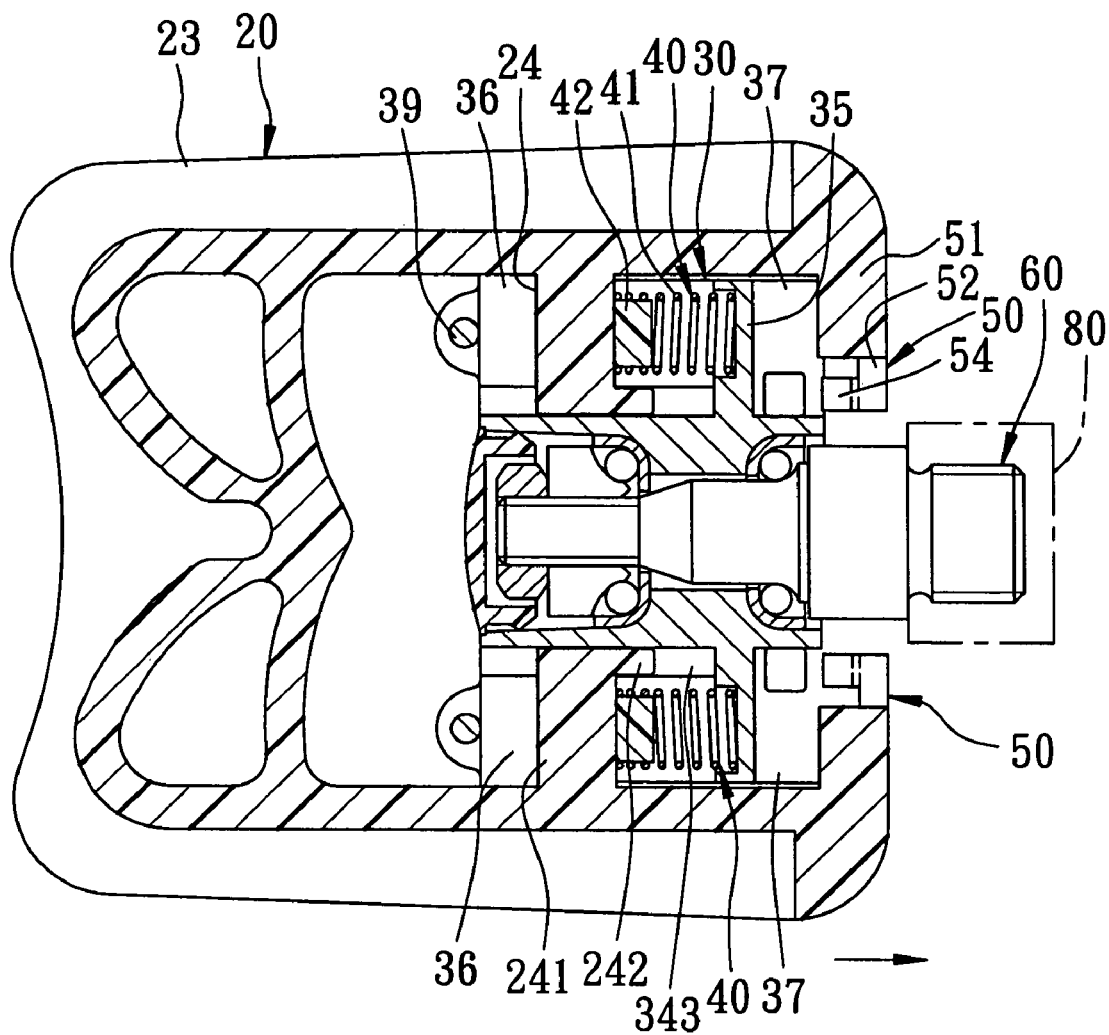
FIGS. 10 to 12 are sectional views to illustrate consecutive steps of how the preferred embodiment is disposed in the folded state.
Figure 11:
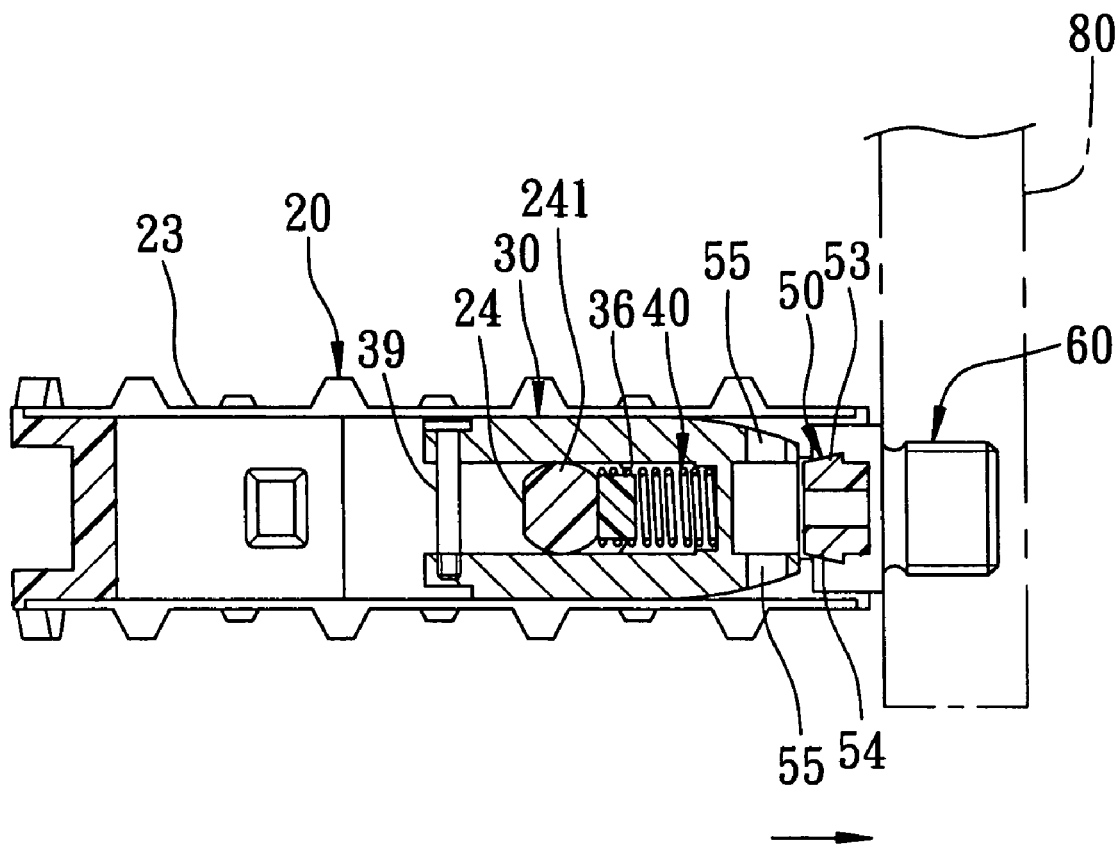
Figure 12:
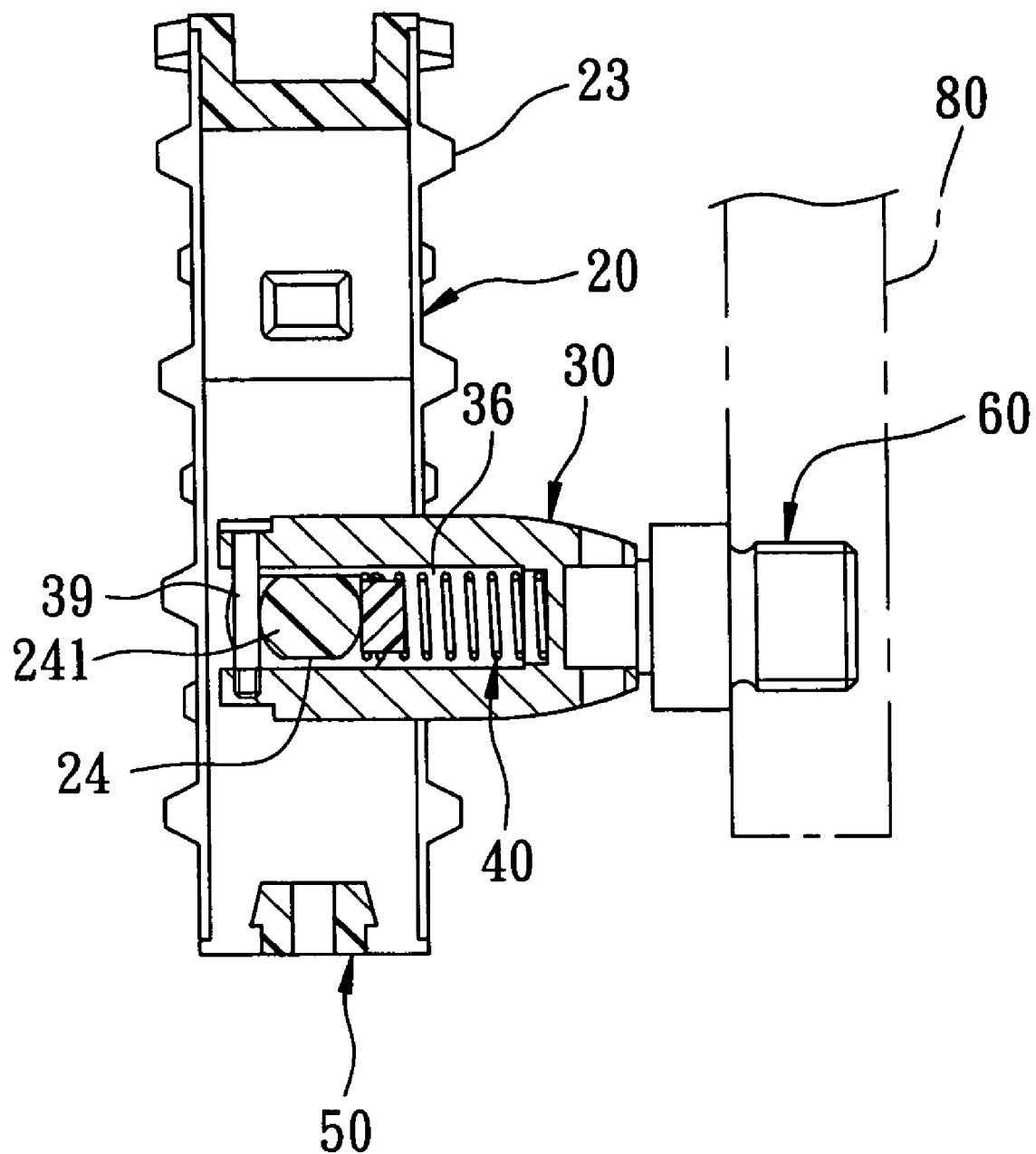

To fold the foldable pedal assembly, as shown in FIGS. 10, 11 and 12, a tool is used for pressing the free ends 52 of the left and right protrusions 51 such that the upper and lower barbs 53, 54 are disengaged from the retaining holes 551. Thereafter, a force is applied to the pedal frame 20 to rotate the pedal frame 20 relative to the crank-connecting part 30 to the folded state.

With the inclusion of the first and second limiting units 90, 50, the aforesaid drawback associated with the prior art can be abated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A foldable pedal assembly comprising:
    a pedal frame defining a frame space and formed with left and right studs that are opposite to each other in an axial direction and that protrude into said frame space;
    a crank-connecting part adapted to be connected to a crank of a bicycle and including left and right wing units that define left and right recesses, respectively, said crank-connecting part extending into said frame space, said left and right studs extending into said left and right recesses and being pivoted to said left and right wing units, respectively;
    left and right urging members disposed in said left and right recesses, respectively, each of said left and right urging members abutting against a respective one of said left and right studs and a respective one of said left and right wing units so as to urge said pedal frame in a first direction that is transverse to said axial direction, and so as to urge said crank-connecting part in a second direction that is opposite to said first direction; and
    first and second limiting units provided on said crank-connecting part and said pedal frame, respectively, said first limiting unit abutting against at least one of said left and right studs by virtue of the urging action of a respective one of said left and right urging members against said crank-connecting part, said second limiting unit abutting against at least one of said left and right wing units by virtue of the urging action of a respective one of said left and right urging members against said pedal frame.

2. The foldable pedal assembly as claimed in claim 1, wherein said first limiting unit includes left and right bolts, each of said left and right wing units including spaced apart upper and lower wing plates and a partitioning plate that is transverse to and that interconnects said upper and lower wing plates and that cooperates with said upper and lower wing plates to define a respective one of said left and right recesses, each of said upper and lower wing plates having a first end that is formed with an ear, each of said left and right studs having first and second sides, each of said left and right urging members abutting against said first side of the respective one of said left and right studs and said partitioning plate of the respective one of said left and right wing units, each of said left and right bolts extending through said ears of said upper and lower wing plates of the respective one of said left and right wing units and abutting against said second side of the respective one of said left and right studs.

3. The foldable pedal assembly as claimed in claim 2, wherein said ear of said lower wing plate of each of said left and right wing units has an inner thread, each of said left and right bolts engaging threadedly said inner thread of said ear of said lower wing plate of the respective one of said left and right wing units.

4. The foldable pedal assembly as claimed in claim 2, wherein each of said upper and lower wing plates further has a second end that is opposite to said first end of the respective one of said upper and lower wing plates and that is formed with a retaining hole, said pedal frame having left and right frame walls, said left and right studs protruding respectively from said left and right frame walls, said second limiting unit including left and right protrusions that protrude respectively from said left and right frame walls into said frame space, each of said left and right protrusions having a bifurcated free end that is formed with upper and lower barbs, each of said upper and lower barbs of each of said left and right protrusions extending into said retaining hole in said second end of a respective one of said upper and lower wing plates of the respective one of said left and right wing unit.

5. The foldable pedal assembly as claimed in claim 4, wherein said second ends of said upper and lower wing plates and said partitioning plate of each of said left and right wing units cooperatively define a protrusion-receiving recess opposite to a respective one of said left and right recesses, said left and right protrusions projecting into said protrusion-receiving recesses in said left and right wing units, respectively.

6. The foldable pedal assembly as claimed in claim 2, wherein said crank-connecting part further includes a sleeve, said left and right wing units extending from said sleeve in opposite directions, each of said upper and lower wing plates of each of said left and right wing units being formed with a guiding groove disposed adjacent to said sleeve, each of said left and right studs having an enlarged free end that extends into said guiding grooves in said upper and lower wing plates of the respective one of said left and right wing units so as to permit rotation of said pedal frame relative to said crank-connecting part.

* * * * *